June 25, 1957  R. G. ATKINSON ET AL  2,796,878
CONTAMINATION-REDUCTION IN PIPE LINES
Filed May 20, 1953
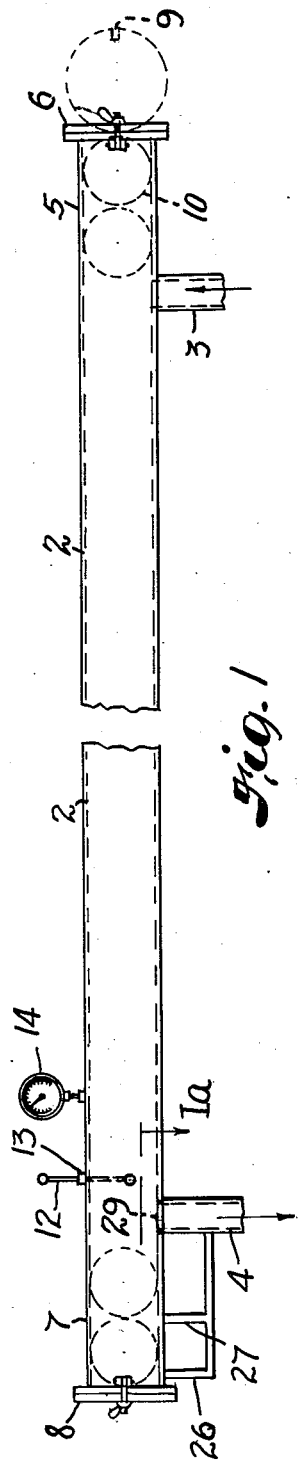
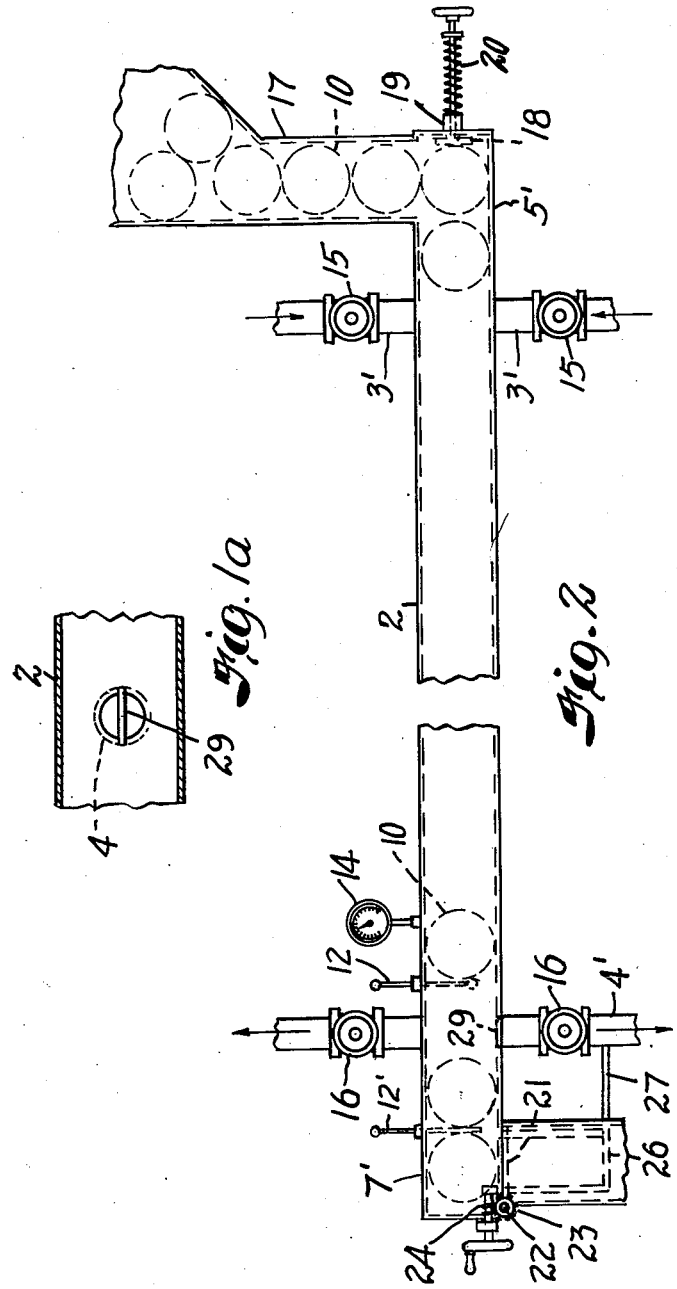
INVENTORS
RALPH G. ATKINSON AND
DUANE R. SWITZER
BY Oberlin & Limbach
ATTORNEYS United States Patent Office 2,796,878
Patented June 25, 1957

2,796,878

CONTAMINATION-REDUCTION IN PIPE LINES

Ralph G. Atkinson and Duane R. Switzer, Maple Heights, Ohio, assignors to The Standard Oil Company, Cleveland, Ohio, a corporation of Ohio Application May 20, 1953, Serial No. 356,291

9 Claims. (Cl. 137—1)

Where pipe lines are used for passage of different liquids, it has been proposed, as in U. S. Patents Nos. 1,966,819 and 2,299,254 to apply between the liquids separating means in the general form of pistons with the idea of maintaining movement of the respective liquids without intermingling and contamination. Unfortunately, such structures do not maintain a sufficiently uniform seal to prevent contamination, and particularly where there are uneven places and lack of uniformity in the inner surface of the pipe lines; and thus intermingling and contamination to an undesirable extent, particularly with some liquids, results. In accordance with the present invention liquids forwarded through a common pipe line are maintained in separation by structural features which inherently fit to even irregular surface portions of the pipe line, and maintain complete separation between adjacent portions of liquids being forwarded. Further features also are available, making possible feed and discharge, with maintained sealing which facilitates operation. Other objects and advantages will appear from the following description.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a sectional view, partly broken, illustrating the invention;

Fig. 1a is a fragmentary section on line Ia, Fig. 1; and

Fig. 2 is a view similar to Fig. 1 including additional features.

Referring to the drawing, there is shown a pipe line 2, with an inlet 3 for liquid supply, and an outlet 4 for discharge. An extension 5 at the forward end, beyond the inlet 3, is provided with a movable closure 6, suitably gasketed, and conveniently mounted for operation, as for instance by a hinge mounting. And at the discharge end there is also an extension 7 beyond the discharge outlet 4, similarly provided with a movable closure 8. Yieldable balls 10 of a size to fit the lumen of the pipe line are supplied as desired through the feed end closure 6, such a ball being introduced as the supply of one liquid is terminated and just before starting the second liquid. These balls or spheres are of material not affected by the liquids being contacted, and as determined thereby may be of rubber, synthetic rubber, plastic, or metal. They may be hollow or filled with a fluid, or solid. And the degree of yieldability may vary somewhat, depending upon particular usages incurred, and may be soft like a sponge rubber ball, or harder. A rather soft ball is particularly desirable ordinarily, as being capable of deforming to accommodate to irregularities encountered in the inside diameter of the pipe line; and the ball should be of large enough diameter to produce a good seal in all parts of the pipe line. One or more balls may be used between diverse liquids. In general, such balls are notably successful, because of their being able to travel through pipes of welded construction, including elbows and irregularities in surface, and a seal is maintained throughout the entire periphery, the ball yielding sufficiently at every point to give an effective seal.

The movable closures or doors 6, 8, are preferably of construction-type permitting easy and rapid manipulation, as for example hinged swing doors equipped at the edge opposite the hinges, with swing clamp-bolts which are pivoted back of the flange on the pipe, and are movable in and out of a notch 9 on the door edge. Near the outlet end 4 a stop pin 12 which enters the pipe through a stuffing box 13 serves to stop the ball when it reaches that point, and the pressure gauge 14 by its showing rapid pressure buildup warns the operator to pull the pin out to release the ball, whereupon it travels beyond the outlet 4 into the extension 7 and the second liquid then discharges.

As an example: The pumping of one liquid into the pipe line by inlet connection 3 being terminated, a ball 10 is introduced by opening the pipe closure and inserting the ball to beyond the inlet connection, and the closure is then shut and another kind of liquid is admitted through the liquid inlet, and immediately forces the ball along through the pipe ahead of it until the stop pin is reached. By the pressure buildup, the operator is aware that the ball is at this point, and he pulls the pin out sufficiently to allow it to pass on into the extension beyond the liquid outlet, and the second liquid then discharges.

By the pipe extensions 5 and 7, there is provision for accommodating two balls between the closure and the inlet or outlet connection respectively, and thereby the ball nearest to the connection provides a seal while a second ball can be introduced at the feed end, and similarly; at the discharge end, the ball nearest the outlet 4 serves as a seal while the ball next to the closure 8 is being removed.

As shown in Fig. 2, it is in some cases desirable to have two inlets 3', each with a shut off valve 15, and again at the outlet end there are two outlet connections 4' each with its shut off valve 16. At the inlet end, extension 5' has a ball feed connection 17 by which the balls 10' progressively feed down into the extension. A positioner 18 with stem extending out through a stuffing box 19, the stem normally being in extended position, as by a spring 20, permits the operator to push a ball forward at times desired. At the discharge end of the pipe line, the extension 7' has ball outlet means, such as a normally closed trap door 21 carried by shaft 22. A worm-gear 23 on this shaft and a cooperating worm 24 and operating hand-wheel swing the door down and permit exit of the ball. It is seen that again balls in the inlet extension 5' provide sealing, and one ball at a time is fed forwardly into the pipe line by the operator manipulating the feeder 18, and the valves 15 are correspondingly closed and opened for the stoppage of the flow of the first liquid and the beginning of the flow of the second after the intervening ball is pushed forward. At the outlet end, again the ball between the two liquids comes to a stop at the pin 12, and the operator noting the pressure buildup on the gauge, appropriately closes one valve 16 and opens the other and withdraws the pin 12 to allow the ball to be pushed on into the extension 7'. Here again, the ball nearest the outlet connection 4' serves as a seal while the one at the end is being discharged through the door 21. A stop pin 12' may be desired in some cases.

To prevent any possible blocking of the outlet connection by a ball settling closely over the outlet, a narrow bar 29 oriented longitudinally with the pipe line is disposed at the outlet of pipe 4, as shown at Figs. 1 and 1a. The pipe 4' in Fig. 2 is similarly equipped. In some cases, it is desirable to provide liquid by-pass connections 26, 27 into the outlet pipes shown in Figs. 1 and 2.

Other modes of applying the principle of the invention may be employed, change being made as regards the details described, provided the features stated in any of the following claims or the equivalent of such be employed.

We therefore particularly point out and distinctly claim as our invention:

1. A pipe line having a connection for supply of liquids, a yieldable ball of diameter fitting the lumen of the pipe line, a connection at a remote point on the pipe line for outlet of liquid, a ball stop element and a pressure gauge ahead of the outlet connection, and a ball outlet beyond the liquid outlet connection.

2. A pipe line having a connection for supply of liquids, a yieldable ball of diameter fitting the lumen of the pipe line, an extension on the pipe line ahead of the liquid inlet connection, a connection at a remote point on the pipe line for outlet of liquid, a ball stop element and a pressure gauge ahead of the outlet connection, an extension of the pipe beyond said liquid outlet connection, and a ball outlet at the end of said extension.

3. A pipe line having connections for supply of different liquids, feed means rearwardly of such connections for introducing yieldable balls whose diameter fills the lumen of the pipe line, a shut off valve on each said connection, connections at a remote point on the pipe line for outlet of different liquids, a shut off valve on each outlet connection, a ball stop and a pressure gauge ahead of the outlet connections, and ball discharge means beyond the latter connections.

4. A pipe line having connections for supply of different liquids, feed means rearwardly of such connections for introducing yieldable balls whose diameter fills the lumen of the pipe line, said feed means including a swingable door, a shut off valve on each said connection, connections at a remote point on the pipe line for outlet of different liquids, an extension at the end of the pipe line, by-pass connections from said extension to the outlet connection, a shut off valve on the outlet connection, a ball stop and a pressure gauge ahead of the outlet connections, and ball discharge means beyond the liquid outlet connections.

5. A method of forwarding different liquids in succession through a pipe line having liquid inlet and liquid outlet connections and an extension ahead of the inlet connection and another extension beyond the outlet connection, comprising the steps of: introducing a yieldable ball between feed of liquids, blocking the ball at the approach of the liquid outlet, and releasing the ball into the extension when the pressure rises.

6. A method of forwarding different liquids in succession through a pipe line having liquid inlet and liquid outlet connections and an extension ahead of the inlet connection and another extension beyond the outlet connection, comprising the steps of: moving a yieldable ball along between supply of different liquids and beyond the liquid discharge outlet into the pipe extension, and sealing the extension against liquid by the next succeeding ball while removing the first.

7. A pipe line through which it is desired to pass different liquids in succession, a yieldable barrier insertible in and effective to seal such line between successive slugs of different liquids, said barrier being movable along the line as thus positioned to maintain the slugs separated, an outlet connection for such line, a withdrawable stop member inserted in the line ahead of said outlet connection, and a pressure indicator connected to the line adjacent and ahead of said stop member, the latter being operative releasably to arrest the barrier while in sealing condition upon approach thereof to the outlet connection, an increase in line pressure to the rear of the arrested barrier resulting and being indicated by said indicator, whereby the indicator signals the presence of the barrier at the stop member.

8. A pipe line having a connection for the supply of different liquids in succession, a yieldable ball of a diameter fitting the lumen of the pipe line to seal the same between successive slugs of such liquids, a remote outlet connection for discharge of the liquids from the line, and signalling means operative to detect and provide a perceptible signal indicating the arrival of said ball at a predetermined point adjacent but ahead of said outlet connection, the ball being in pipe sealing condition at such point and said signalling means being thus operative without disrupting such seal.

9. A pipe line through which it is desired to pass different liquids in succession, a yieldable barrier insertible in and effective to seal such line between successive slugs of different liquids, said barrier being movable along the line as thus positioned to maintain the slugs separated, an outlet connection for such line, stop means operative releasably to arrest said barrier while in sealing condition upon arrival of the same at a predetermined point before the outlet connection, and signalling means operative to detect and provide a perceptible signal as an indication of such arrest of the barrier by said stop means.

References Cited in the file of this patent

UNITED STATES PATENTS

| 973,794 | Lightcap | Oct. 25, 1910 |
| 1,483,494 | Townsend | Feb. 12, 1924 |
| 1,966,819 | Irvin | July 17, 1934 |
| 2,028,779 | Howe | Jan. 28, 1936 |
| 2,638,308 | Kell | May 12, 1953 |

FOREIGN PATENTS

| 309,344 | Great Britain | Apr. 11, 1929 |
| 277,230 | Italy | September 1930 |